(12) United States Patent
Sohnle (10) Patent No.: US 11,229,196 B1
(45) Date of Patent: Jan. 25, 2022

(54) CATCH AND RELEASE APPARATUS

(71) Applicant: Peter G. Sohnle, Wauwatosa, WI (US)

(72) Inventor: Peter G. Sohnle, Wauwatosa, WI (US)

( * ) Notice: Subject to any disclaimer, the term of this patent is extended or adjusted under 35 U.S.C. 154(b) by 0 days.

(21) Appl. No.: 17/190,840

(22) Filed: Mar. 3, 2021

(51) Int. Cl.
*A01K 97/18* (2006.01)
*A01K 97/24* (2006.01)
*A01K 77/00* (2006.01)

(52) U.S. Cl.
CPC .............. *A01K 97/18* (2013.01); *A01K 77/00* (2013.01); *A01K 97/24* (2013.01)

(58) Field of Classification Search
CPC ......... A01K 97/18; A01K 97/24; A01K 77/00
USPC .............. 43/54.5, 5, 17.2, 11, 12, 7; 15/142, 15/104.001, 208, 229.11, 229.12
See application file for complete search history.

(56) References Cited

U.S. PATENT DOCUMENTS

| | | | | |
|---|---|---|---|---|
| 273,279 A * | 3/1883 | Hosea | .................... | A01K 77/00 43/11 |
| 549,368 A * | 11/1895 | Keenan | .................. | A01K 77/00 43/12 |
| 844,594 A * | 2/1907 | Haskell | .................. | A01K 77/00 43/12 |
| 1,088,766 A * | 3/1914 | Borgardt | ................ | A01K 77/00 43/12 |
| 1,366,145 A * | 1/1921 | Wolf | ...................... | A01K 77/00 43/12 |
| 1,387,393 A * | 8/1921 | Hanel | .................... | A01K 77/00 43/12 |
| 1,416,543 A * | 5/1922 | Bartos | .................... | A01K 77/00 43/12 |
| 1,742,550 A * | 1/1930 | Mann | ...................... | A01K 77/00 43/12 |
| 2,066,439 A * | 1/1937 | Wine | ...................... | A01K 77/00 43/12 |
| 2,245,993 A * | 6/1941 | McCoy | .................. | A01K 77/00 43/12 |
| 2,482,718 A * | 9/1949 | Guy | ........................ | A01K 77/00 43/12 |
| 2,595,597 A * | 5/1952 | Morseth | ................. | A01K 77/00 285/302 |
| 2,600,773 A * | 6/1952 | Hungerford | ........... | A01K 77/00 43/12 |
| 2,676,430 A | 4/1954 | Richards | | |
| 2,732,650 A | 1/1956 | Passmore | | |

(Continued)

FOREIGN PATENT DOCUMENTS

BE 1009063 A3 * 11/1996 ............. A01K 77/00
CA 2480124 A1 * 2/2006 ............. A01K 77/00
(Continued)

OTHER PUBLICATIONS

Translation of JP 6-3070 (Year: 1994).*
Translation of JP 7-13152 (Year: 1995).*
U.S. Appl. No. 09/825,050, filed Apr. 3, 2001, now abandoned.

*Primary Examiner* — Darren W Ark
(74) *Attorney, Agent, or Firm* — Andrus Intellectual Property Law, LLP (57) ABSTRACT

An apparatus for releasing fish from a hook while the fish is in water includes a rod having a first rod end and an opposite second rod end. A frame extends from the second rod end, and netting is wrapped around the frame and configured to ensnare the hook such that the hook can be removed from the fish thereby releasing the fish.

2 Claims, 8 Drawing Sheets

(56) References Cited

U.S. PATENT DOCUMENTS

| | | | | |
|---|---|---|---|---|
| 2,940,203 | A * | 6/1960 | Carter | A01K 97/24 43/17.2 |
| D192,688 | S | 5/1962 | Watts | |
| 3,082,561 | A * | 3/1963 | Convey | A01K 77/00 43/11 |
| 3,531,887 | A * | 10/1970 | Bortle | A01K 97/24 43/17.2 |
| D219,145 | S | 11/1970 | Howerter | |
| D222,059 | S | 9/1971 | Howerter | |
| 3,693,280 | A * | 9/1972 | Calhoun | A01K 97/24 43/17.2 |
| 3,747,250 | A * | 7/1973 | Willinger | A01K 77/00 43/11 |
| 3,760,523 | A * | 9/1973 | Maxwell | A01K 77/00 43/11 |
| 3,815,272 | A * | 6/1974 | Marleau | A01K 77/00 43/12 |
| 3,830,005 | A * | 8/1974 | Kimbrough | A01K 97/24 43/17.2 |
| 3,849,926 | A * | 11/1974 | Fox | A01K 77/00 43/11 |
| 3,872,618 | A * | 3/1975 | Petersen, Jr. | A01K 97/18 43/53.5 |
| 4,063,380 | A * | 12/1977 | Grim | A01K 77/00 43/11 |
| 4,251,938 | A * | 2/1981 | Goldman | A01K 77/00 43/11 |
| 4,292,753 | A * | 10/1981 | Yesuratnam | A01K 77/00 43/11 |
| 4,514,925 | A * | 5/1985 | Rockwood | A01K 77/00 43/12 |
| 4,524,536 | A * | 6/1985 | Eckerson | A01K 97/24 43/17.2 |
| 4,619,065 | A * | 10/1986 | Jones | A01K 97/24 43/11 |
| 4,622,772 | A * | 11/1986 | Cawley | A01K 97/24 43/17.2 |
| 4,631,851 | A * | 12/1986 | Whitehurst | A01K 77/00 43/7 |
| 4,653,214 | A * | 3/1987 | Cline | A01K 77/00 43/11 |
| 4,932,150 | A * | 6/1990 | Sher | A01K 77/00 43/11 |
| 5,216,828 | A * | 6/1993 | Langstone | A01K 97/24 43/17.2 |
| 5,276,995 | A * | 1/1994 | Johnson | A01K 77/00 43/11 |
| 5,342,513 | A * | 8/1994 | Wall | E04H 4/1609 15/1.7 |
| D372,294 | S | 7/1996 | Grimaldi | |
| 5,822,908 | A * | 10/1998 | Blanchard | A01K 77/00 43/11 |
| 6,138,401 | A | 10/2000 | Duncan | |
| 6,205,699 | B1 | 3/2001 | Bogni | |
| 6,397,512 | B1 | 6/2002 | Chang | |
| 6,397,513 | B1 | 6/2002 | Reed | |
| 6,694,664 | B1 | 2/2004 | Knight | |
| 6,772,554 | B1 | 8/2004 | Boone | |
| 6,840,002 | B1 | 1/2005 | Dick | |
| 7,337,576 | B2 * | 3/2008 | Boltan | A01K 77/00 43/5 |
| 7,624,530 | B2 * | 12/2009 | Resch | A01K 77/00 43/12 |
| 7,818,914 | B1 | 10/2010 | Baiamonte et al. | |
| 7,975,424 | B1 * | 7/2011 | Shooter, II | A01K 77/00 43/7 |
| 8,261,482 | B1 * | 9/2012 | Buchanan | A01K 77/00 43/12 |
| 8,490,318 | B2 * | 7/2013 | Smith | A01K 77/00 43/12 |
| 8,806,801 | B2 * | 8/2014 | Steffens | A01K 77/00 43/12 |
| 8,857,098 | B2 * | 10/2014 | Marks | A01K 77/00 43/12 |
| 9,485,979 | B1 | 11/2016 | Kangatharalingam et al. | |
| 10,188,089 | B2 | 1/2019 | Muehlenthaler | |
| 10,595,518 | B1 * | 3/2020 | Patterson | A01K 74/00 |
| 10,653,126 | B2 | 5/2020 | Nelson | |
| 2004/0217246 | A1 * | 11/2004 | Adams | A01K 77/00 248/291.1 |
| 2006/0185215 | A1 * | 8/2006 | Corbett | A01K 77/00 43/11 |
| 2009/0229167 | A1 | 9/2009 | Doss | |
| 2011/0258902 | A1 | 10/2011 | Cason | |
| 2020/0178509 | A1 * | 6/2020 | Vesich | A01K 77/00 |

FOREIGN PATENT DOCUMENTS

| | | | | |
|---|---|---|---|---|
| DE | 9417936 | U1 * | 1/1995 | A01K 77/00 |
| DE | 10125755 | A1 * | 12/2002 | A01K 77/00 |
| ES | 2021490 | A6 * | 11/1991 | A01K 77/00 |
| FR | 621672 | A * | 5/1927 | A01K 77/00 |
| FR | 773826 | A * | 11/1934 | A01K 77/00 |
| FR | 2338773 | A1 * | 8/1977 | B25G 1/04 |
| GB | 1249298 | A * | 10/1971 | A01K 77/00 |
| GB | 1545476 | A * | 5/1979 | A01K 77/00 |
| GB | 2026821 | A * | 2/1980 | F16C 11/10 |
| GB | 2098441 | A * | 11/1982 | A01K 77/00 |
| GB | 2290013 | A * | 12/1995 | A01K 77/00 |
| GB | 2432502 | A * | 5/2007 | A01K 77/00 |
| JP | H063070 | U * | 1/1994 | |
| JP | 06217665 | A * | 8/1994 | |
| JP | H0661067 | U * | 8/1994 | |
| JP | H0713152 | U * | 3/1995 | |
| JP | 2501129 | Y2 * | 6/1996 | |
| JP | 2572051 | Y2 * | 5/1998 | |
| JP | 2586283 | Y2 * | 12/1998 | |
| JP | 2592193 | Y2 * | 3/1999 | |
| JP | 2598769 | Y2 * | 8/1999 | |
| JP | 2001292678 | A * | 10/2001 | |
| JP | 2004033060 | A * | 2/2004 | |
| JP | 2006149357 | A * | 6/2006 | |
| JP | 3161919 | U * | 8/2010 | |
| JP | 3164844 | U * | 12/2010 | |
| JP | 5046275 | B2 * | 10/2012 | |
| JP | 2014057558 | A * | 4/2014 | |
| SU | 973091 | A1 * | 11/1982 | |
| WO | WO-9805203 | A1 * | 2/1998 | A01K 63/006 |
| WO | WO-0103553 | A1 * | 1/2001 | A01K 77/00 |

\* cited by examiner

CATCH AND RELEASE APPARATUS

FIELD

The present disclosure relates to fishing and more specifically to catch and release apparatuses for releasing fish from fishing hooks.

BACKGROUND

Wildlife authorities often enact catch and release rules to prevent over fishing of fish from heavily used bodies of water and stabilize local fish populations that would otherwise continue to decrease or become decimated. Catch and release rules are becoming very popular in the United States and elsewhere in the world, and in some areas, only catch and release fishing is allowed. In addition, certain areas, such as Canada, have regulations that require larger specimens be returned to the water unhurt in order to promote spawning and/or improved fishing for larger trophy fish.

Regardless of whether catch and release is performed voluntarily or required by various rules, it must be done properly if it is to succeed in returning the fish to the water in a condition that will allow the fish to survive. Fish that are caught and released may still die because of stress from prolonged fighting, or from damage done by the hook or by handling after being caught or landed. Most recommendations for releasing fish dictate as little handling as possible in order to prevent damage to the gills and soft underbelly and avoid removal of the fish's natural protective mucous layer. In fact, the best method is to release the fish while the fish is still in the water, without netting and landing the fish. In addition to the better condition of the released fish, there are other benefits to the fisher if a hooked fish can be released without netting or landing it. Many fish produce enough of their slimy protective mucous that it often is left behind as an undesirable residue on the boat, as well as the hands and clothes of the fisher.

Also, large game fish such as freshwater species (e.g., northern pike, muskellunge, lake trout) and saltwater species (e.g., striped bass and king mackerel) are often taken using lures with treble or gang hooks. A landed fish thrashing around in a boat with a partially exposed large treble hook in its mouth can be highly dangerous to the fisher attempting to remove the lure. When removing these hooks from the mouth of a landed fish using a forceps or similar device, the sharp teeth of the fish can also be a risk. Further, having the fish and the treble hooks tangled in a landing net adds to the difficulty and risk of releasing the catch. Conventional dehooking devices, such as forceps, may be cumbersome or may require that the fish be removed from the water.

This Background is intended to introduce various aspects of the art, which may be associated with the present disclosure to thereby assist in providing a framework to facilitate a better understanding of particular aspects of the present disclosure. Accordingly, it should be understood that this Background should be read in this light, and not necessarily as admissions of prior art.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, an apparatus for releasing fish from a hook while the fish is in water includes a rod having a first rod end and an opposite second rod end. A frame extends from the second rod end, and netting is wrapped around the frame and configured to ensnare the hook such that the hook can be removed from the fish thereby releasing the fish.

In certain examples, an apparatus for coupling to a fishing device and for releasing fish from a hook while the fish is water includes a bracket configured to couple to the fishing device. A frame extends from the bracket, and netting is wrapped around the frame and configured to ensnare the hook such that the hook can be removed from the fish thereby releasing the fish.

In certain examples, an apparatus for coupling to another device and for releasing fish from a hook while in the water includes a bracket configured to couple to the other device such as a standard net handle or boat hook. A frame extends from the bracket and netting is wrapped around the frame and configured to ensnare the hook such that the hook can be removed from the fish thereby releasing the fish. In certain examples, the netting is attached to the other device (e.g., the handle end of a fishing net) without the frame.

In certain examples, a method for removing a hook from a fish without landing the fish includes providing rod with a first rod end and an opposite second rod end, wherein a frame extends from the second rod end and netting is wrapped around the frame; moving the netting into engagement with the hook to thereby ensnare the hook in the netting; and further moving the netting to thereby remove the hook from the fish.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
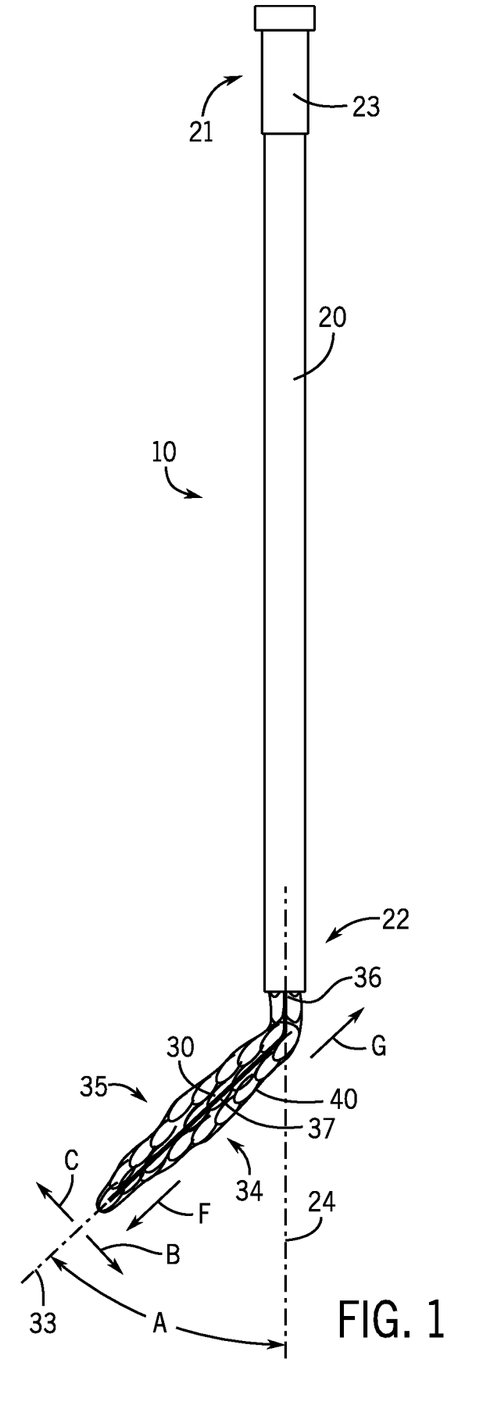
FIG. 1 is a right side view of an example apparatus according to the present disclosure.
Figure 2:
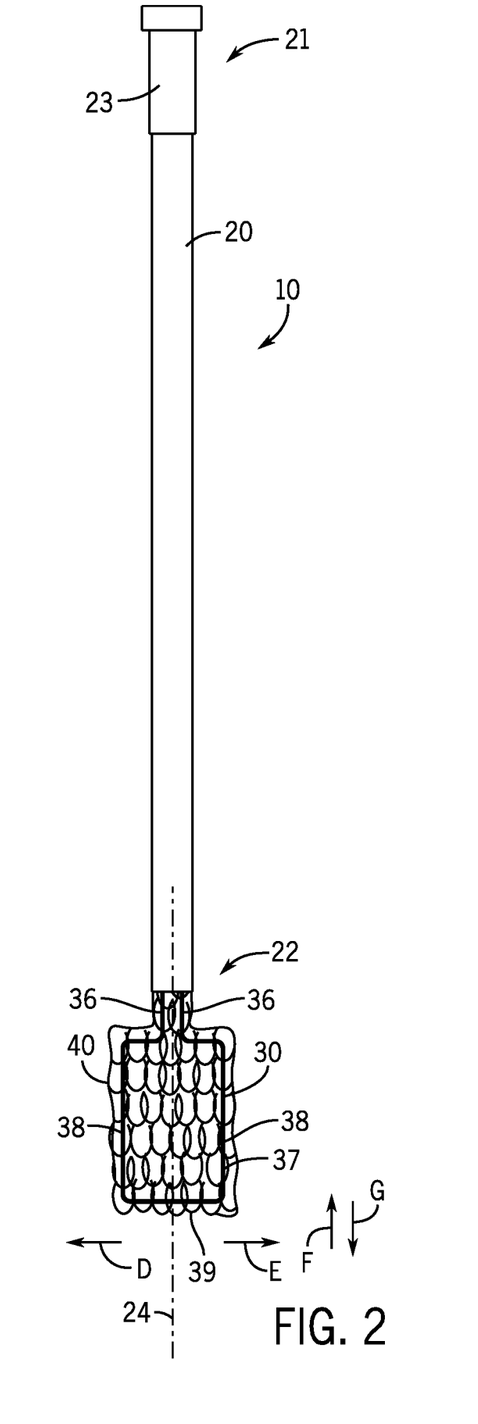
FIG. 2 is a front view of the apparatus of FIG. 1.

FIGS. 1-2 depict an example catch and release apparatus 10 of the present disclosure. The apparatus 10 is for removing a lure from the mouth of a fish (described further hereinbelow). In one example, the apparatus 10 is for removing a lure 54 (see FIG. 6) having one or more hooks embedded in the fish while the fish remains in the water (see FIGS. 5-6). The fisher uses the apparatus 10 to ensnare one or more exposed hooks in netting to thereby immobilize the hooks such that the fisher can further move the apparatus 10 to remove the embedded hooks from the mouth of the fish while the fish remains in the water.

Through research and experimentation, the present inventor endeavored to develop the example apparatuses 10 further described hereinbelow that help a fisher remove a hook embedded in the fish to thereby release the fish. The present inventor has also recognized that there is a need in the industry for apparatuses that easily and quickly remove hooks, e.g., one or more hooks of a treble hook, that are embedded in the fish while the fish is still in the water. In one example, the apparatus 10 of the present disclosure can be used to be release a fish that has one or more hooks of a treble hook embedded in the fish. In this example, one or more of the hooks of the treble hook are unembedded and exposed (e.g., one or more hooks are outside the fish's jaw). Furthermore, the apparatuses 10 of the present disclosure allow the fisher to release the fish without handling the fish with their hands alongside the boat and/or in the water. Instead, the fish can be released at a safe distance (e.g., 3.0 feet) away from the fisher. The apparatuses 10 the present disclosure advantageously have netting that engages one of the non-embedded hooks.

The present inventor has observed that some known devices, such as pliers or forceps and devices disclosed in issued patents, such as the devices disclosed in U.S. Pat. No. D372,294 (Grimaldi II); U.S. Pat. No. 10,653,126 (Nelson); U.S. Pat. No. 10,188,089 (Muehlenthaler); and U.S. Pat. No. 3,872,618 (Petersen); and U.S. Publication No. 2011/0258902 (Cason), can be used to release fish. However, the present inventor recognized that these known devices have several deficiencies. For example, some of these devices require that the fish be landed or handled with the hands of the fisher while the fish is close to the boat or shore in order to remove the embedded hooks. Furthermore, some of these devices do not work well while the fish is moving in the water. In addition, certain devices are used when there are no exposed hooks. For instance, the device disclosed in Peterson is meant to remove a treble hook that is embedded in the gullet of a fish and is used when the fish is landed.

Other devices disclosed in other issued patents, such as the devices disclosed in U.S. Pat. No. 2,676,430 (Richards); U.S. Pat. No. 2,732,650 (Passmore); D219,145 (Howerter); and D192,688 (Watts), are used for releasing hooks that are snagged on or embedded in aquatic plants or the debris on the bottom of the water body. Some of the devices described in these patents include a weight with chains or the like to attach to a snagged lure. Accordingly, some of these devices are attached to the fishing line so that the device slides down the fishing line to either knock the snagged lure loose or catch the hooks so that the hook can be brought back to the fisher. Furthermore, devices for retrieving lures, such as the devices disclosed in U.S. Pat. No. 3,531,887 (Bortle), U.S. Pat. No. 2,940,203 (Carter), and U.S. Pat. No. 4,622,772 (Cawley et al.), are for entangling the hooks of a snagged treble-hook lure to remove it from some underwater obstruction such as rock or marine plants.

Thus, the present inventor has endeavored to develop the apparatuses 10 of the present disclosure that are improved, more useful apparatuses relative to known devices. The apparatuses 10 of the present disclosure are capable of easily removing embedded hooks from a fish while the fish in the water. Furthermore, the present inventor has recognized that known devices are not easily modified to remove embedded hooks from fish. Accordingly, the present inventor has developed the apparatuses 10 of the present disclosure that embody new features that are significant improvements over known devices.

The apparatus 10 depicted in FIGS. 1-2 includes a rod 20 that can be held by a fisher, a frame 30 coupled to an end of the rod 20, and netting 40 wrapped around the frame 30 that engages with hooks of the lure. These components are described in greater detail hereinbelow.

The rod 20 has a first rod end 21 and an opposite second rod end 22. The rod 20 extends along a first axis 24 between the rod ends 21, 22. The rod 20 is formed from any suitable material such as plastic, metal, and wood. In certain examples, the material forming the rod 20 is a buoyant material such that the rod 20 and/or the apparatus 10 floats in water. The cross-sectional shape of the rod 20 can vary. For example, the rod 20 can be a solid, hollow, cylindrical, and/or square. A handle 23 is coupled to the first end 21 that can be grasped/gripped by an operator. The handle 23 is formed from any suitable material such as compressible foam and rubber. The handle is coupled to the first rod end 21 with fasteners (e.g., nuts and bolts) and/or adhesives. In certain examples, the handle 23 is integrally formed with the rod 20.

The frame 30 is coupled to the second end 22 of the rod 20, and the frame 30 extends along a second axis 33 away from the second end 22 of the rod 20. The second axis 33 extends transverse to the first axis 24, and an angle A is defined between the first axis 24 and the second axis 33. The angle A can vary, and the angle A has a value in the range of 5.0-85.0 degrees. In one example, the angle A is 30.0 degrees. In another example, the angle A is 45.0 degrees. The frame 30 has a backside 34 that faces the first axis 24 and the angle A. The frame 30 also has an opposite front side 35 that faces away from the first axis 24 and the angle A.

The frame 30 has one or more legs 36 the extend parallel to the first axis 24. Note that the example frame 30 depicted in FIG. 2 has two legs 36 that extend parallel to the first axis 24. The legs 36 extend into a bore 25 in the second rod end 22 and are removably or fixedly coupled to the second rod end 22. The legs 36 can be coupled to the second rod end 22 in any suitable manner. For example, the legs 36 can be coupled to the second rod end 22 with adhesive tape, mechanical fasteners (e.g., nuts and bolts, screws), or adhesive glue. Other example connections between the legs 36 and the second rod end 22 are described hereinbelow.

The frame 30 also has a body 37 that connects to the legs 36. The body 37 acts as a structure that supports the netting 40, and the body 37 restricts excessive movement of the netting 40 (described hereinbelow). The body 37 has a pair of sides 38 and an end 39 extending between the sides 38. The shape of the body 37 is rectangular (e.g., the body is generally rectangularly shaped). The body 37 also lies within a plane (not shown) and is relatively thin (e.g., 1.0-1.5 inches in diameter or thickness). In certain examples, the rectangular shape and the relatively thin profile of the body 37 is advantageous in engaging only the embedded hook when the fish is caught with a lure having more than one hook. Note that the shape and size of the body can vary (e.g. circular, oblong, elliptical).

As noted above, the netting 40 is wrapped around the frame 30. For example, the netting 40 is loosely wrapped around the frame 30 such that the netting 40 is not tightly wrapped on the frame 30 (e.g., the netting 40 is not taut on the frame 30). The netting 40 can be one continuous piece of netting material such that all portions of the netting 40 that are wrapped around the frame 30 are connected to each.

Note that in other examples, different pieces of netting material may be coupled together. The netting 40 can be formed with any suitable material, and in one example, the netting 40 is formed with lightweight interwoven fabric or plastic material. Note that in certain examples, the netting 40 is wrapped several times around the frame 30 such that there are layers of netting 40 wrapped around the frame 30. In one instance, there are eight layers of netting 40 wrapped around the frame 30.

The netting 40 extends around all sides of the body 37, including the backside 34 and the front side 35 of the frame 30. The netting 40 is movable relative to the frame 30 as the apparatus 10 is maneuvered into position alongside the fish. That is, the netting 40 may move relative to the frame 30 due to gravity and/or when the operator moves the apparatus 10 through the air or the water during use. For instance, the netting 40 can move toward and/or away from the backside 34 and/or the front side 35 (see arrows B and C on FIG. 1), toward and/or away from the sides 38 (see arrow D and E on FIG. 2), and/or toward and/or away from the end 39 and opposing end (see arrow F and G on FIG. 2). As portions of the netting 40 move in a certain direction, such as when the netting 40 along the backside 34 moves away from the frame 30 (see arrow B), other portions of the netting 40 move toward the frame 30 and contact the frame 30, such as the netting 40 along the front side 35, thereby restricting or limiting the movement of the netting 40 away from the frame 30. Wrapping the netting 40 around the frame 30 and the limited movement of the netting 40 relative to the frame 30 gives the example apparatus 10 several advantages over known devices. For example, the frame 30 advantageously supports the netting 40 and gives the netting 40 a "shape" that aids in positioning the netting 40 next to the fish. Thus, as the fisher moves the apparatus 10 to approach the fish and the exposed hooks extending from the fish, the frame 30 generally helps maintain "shape" of the netting 40 such that there is a large surface (e.g., the surface of the netting 40 along the backside 34 of the frame 30) to ensnare the exposed hook. The "shape" of the netting 40 along the backside 34 of the frame 30 generally corresponds to the shape of the body 37 (e.g., the netting 40 along the backside 34 of the frame 30 is generally within a plane that lies parallel to the frame 30). Furthermore, the netting 40 has limited movement relative to the frame 30 which also aids the fisher in ensnaring the exposed hook into the netting 40 and prevents the operator from contacting the fish with excessive force. The frame 30 allows the apparatus 10 and/or the netting 40 to approach exposed hooks in a precise path and motion. The present inventor has further determined that the frame 30 advantageously prevents the netting 40 from randomly or excessively moving in the water as the fisher moves the apparatus 10 and/or the netting 40 in the water thereby increasing the likelihood that the netting 40 will engage with the exposed hooks as the fisher moves the netting 40 along the fish. As such, the fisher may only need to move the netting 40 past the exposed hooks one time.

Figure 3:
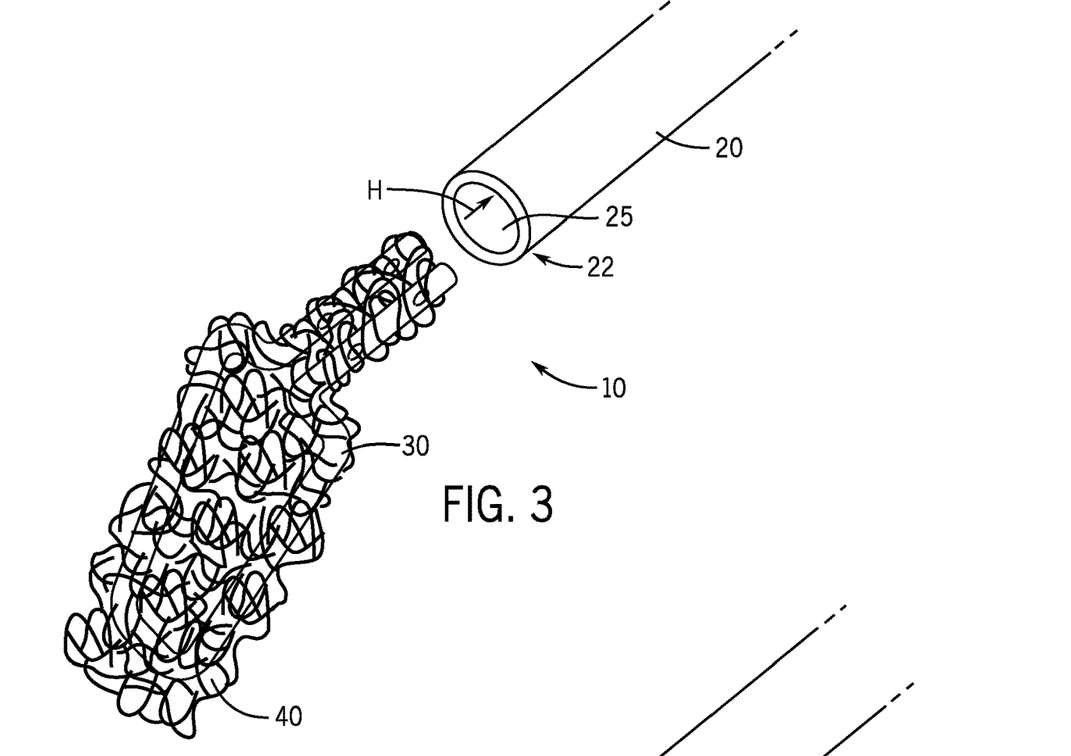
FIGS. 3-4 are perspective views of another example apparatus according to the present disclosure.
Figure 4:
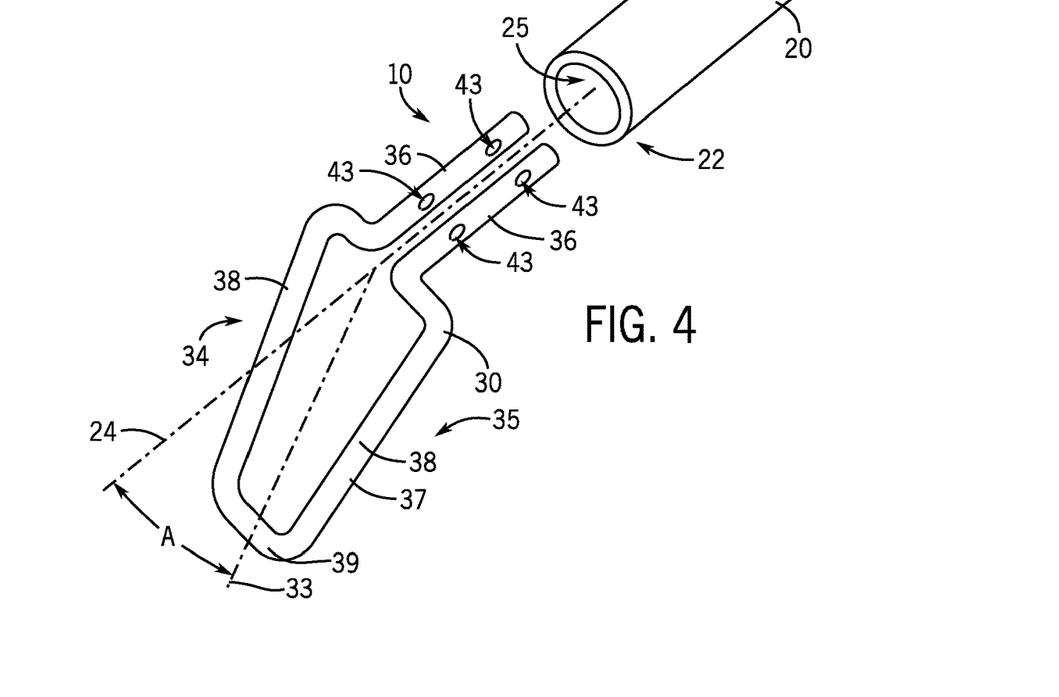

FIGS. 3-4 depict another example apparatus 10 according to the present disclosure. This example apparatus 10 includes a rod 20 with a bore 25 that extends along the first axis 24. The legs 36 of the frame 30 are received into the bore 25 (see arrow H) on FIG. 3. The netting 40 is wrapped around the body 37 and the legs 36 of the frame 30, and when the frame 30 is coupled to the rod 20, a portion on the netting 40 is in the bore 25. FIG. 4 depicts the frame 30 without netting 40 wrapped therearound. The body 37 extending along the second axis 33, and the body 37 has a rectangular shape with sides 38 that taper toward the end 39 (e.g., distance between the sides 38 and the second axis 33 near the legs 36 of the frame 30 is greater than the distance between the sides 38 and the second axis 33 near the end 39). The legs 36 include holes 43 for receiving bolts (not shown) that extend through corresponding holes (not shown) in the rod 20 to thereby couple the frame 30 to the rod 20.

Figure 5:
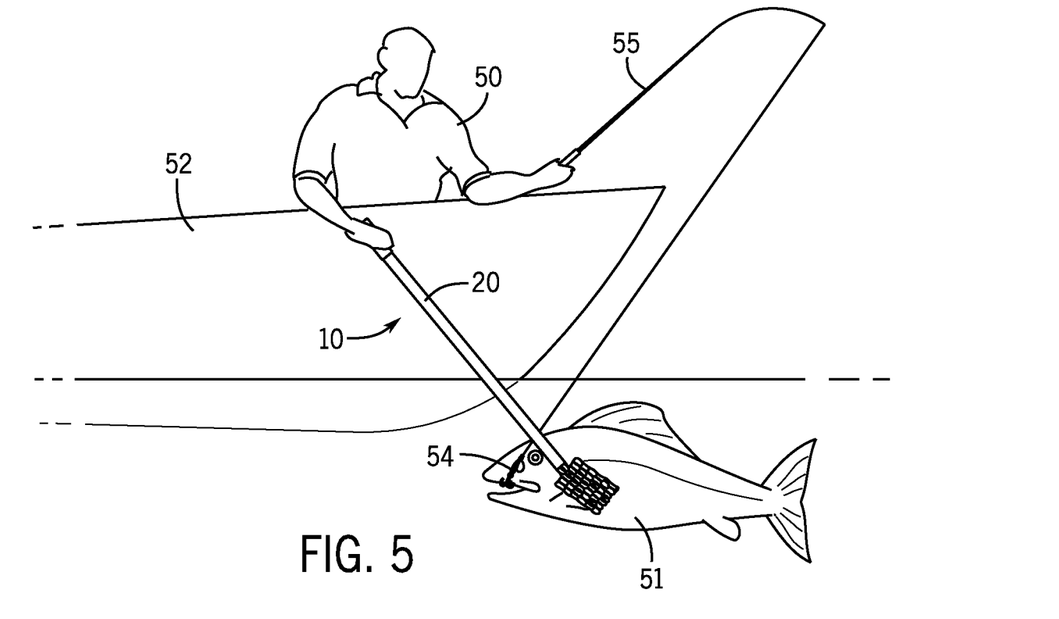
FIG. 5-8 depict an example operational sequence for using an example apparatus according to the present disclosure.
Figure 6:
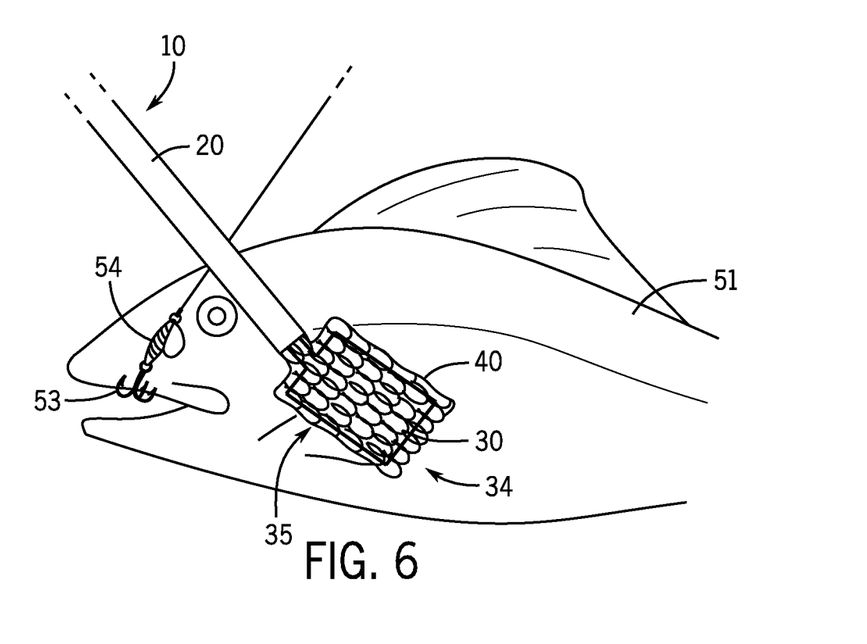

Referring now to FIGS. 5-8, an example operational sequence for using the apparatus 10 to remove a hook from the fish is depicted. FIG. 5 depicts that a fisher 50 has caught a fish 51. The fish 51 has one or more exposed hooks 53 (e.g., the exposed hooks are part of a treble hook coupled to a lure 54) that extend away from the fish 51. The fisher 50 brings the fish 51 alongside the boat 52 using one hand to guide the fish 51 via the fishing pole 55. The fisher 50 uses the other hand to bring the apparatus 10 alongside the fish 51 (see also FIG. 6). Specifically, the fisher 50 moves the apparatus 10 such that the portion of the netting 40 along the backside 34 (see FIG. 1) of the frame 30 is along the side of the fish 51. The netting 40 is positioned near the middle of the fish 51 between the month end and the tail.

Figure 7:
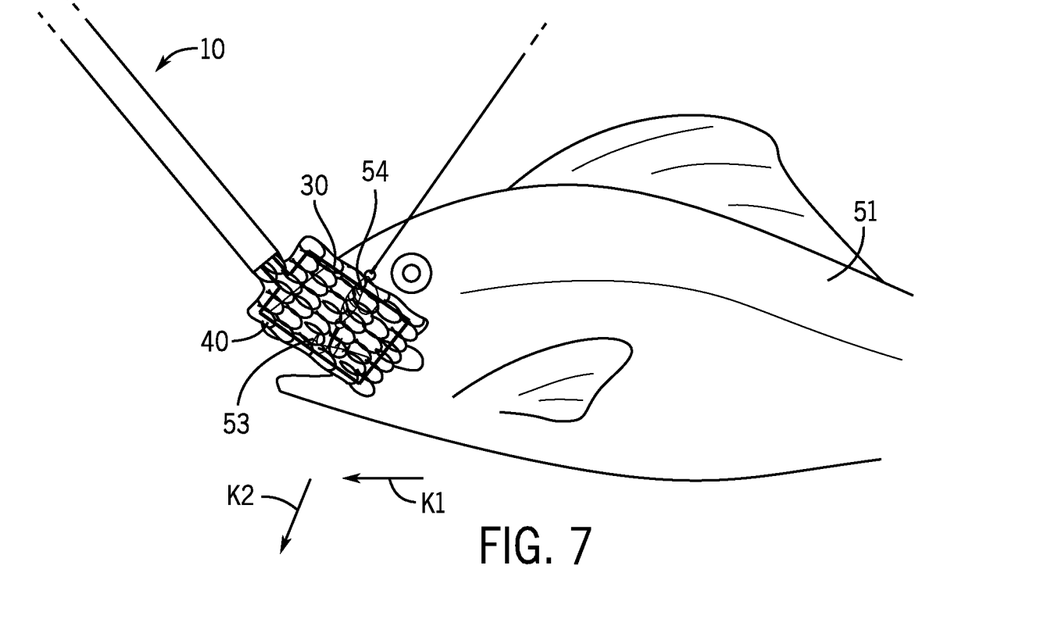
Figure 8:
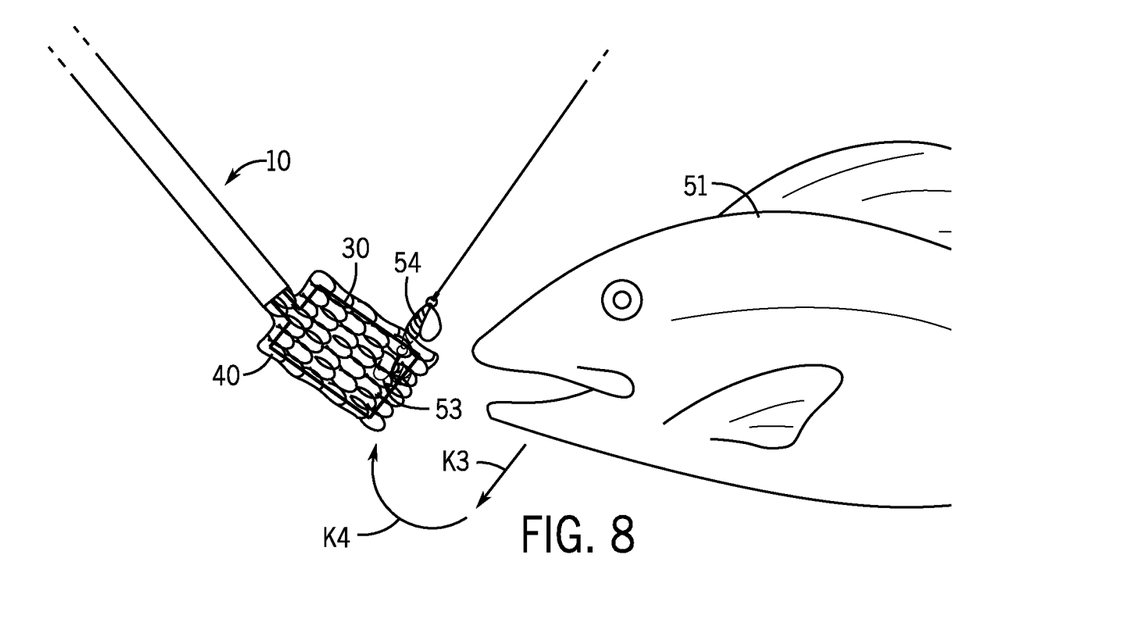

Referring now to FIG. 7, the fisher 50 moves the netting 40 in a "sweeping" motion toward the exposed hook 53 (see arrow K1) and in a direction toward the point of the hook 53 (see arrow K2) such that the hook 53 is entangled or ensnared within the netting 40. As the fisher 50 moves the apparatus 10 as noted above, the backside 34 (FIG. 1) of the frame 30 faces the fish 51 and the netting 40 along the backside 34 of the frame 30 is between the frame 30 and the fish 51. Due to the features noted above that the netting 40 is movable relative to the frame 30, the netting 40 may flex or move toward or away from the fish 51 as the fish 51 struggles in the water, water moves, and/or the apparatus 10 is moved. Accordingly, the fisher 50 does not need to apply a hard pressure via the frame 30 to the fish 51 to ensnare the exposed hook 53 in the netting 40. Once the hook 53 is entangled or ensnared within the netting 40, the exposed hook 53, as well as the hook(s) embedded in the fish 51, are generally fixed in place. As a natural instinct, the fish 51 may jerk away from the apparatus 10 as the apparatus 10 is moved in the manner noted above and shake itself loose from the hooks.

If the fish 51 does not shake itself loose, the fisher 50 can further move the apparatus 10, and thereby the ensnared exposed hook 53, to release the fish 51. Specifically, the fisher 50 moves the apparatus 10 in a direction along the exposed hook 53 (see arrow K3, note that direction along the hook 53 can be the same direction K2) to thereby pull the hook 53 and cause the other embedded hooks in the fish 51 to exit the fish 51. Accordingly, the fish 51 is free and the fisher 50 moves the netting 40 with the hook 53 ensnared therein away from the fish 51 and back toward the boat 52 (FIG. 5). The apparatus 10 advantageously allows the fisher 50 to release the fish 51 in the water without pulling the fish 51 out of the water and/or into the boat 52.

Note that if the fisher 50 is unsuccessful in removing the hook 53 as noted above, the fisher 50 may use the apparatus 10 assist in releasing the fish 51 in other ways. For instance, the apparatus 10 can be used to pull the fish 51 into the boat 52 so that the treble hook 53 can be removed by a conventional means, such as by using forceps. The apparatus 10 may advantageously be used to restrict the movement of the fish 51 while the embedded hooks are removed.

Referring to FIGS. 9-15, other example apparatuses 10 of the present disclosure. These example apparatuses 10 are described hereinbelow in greater detail.

Figure 9:
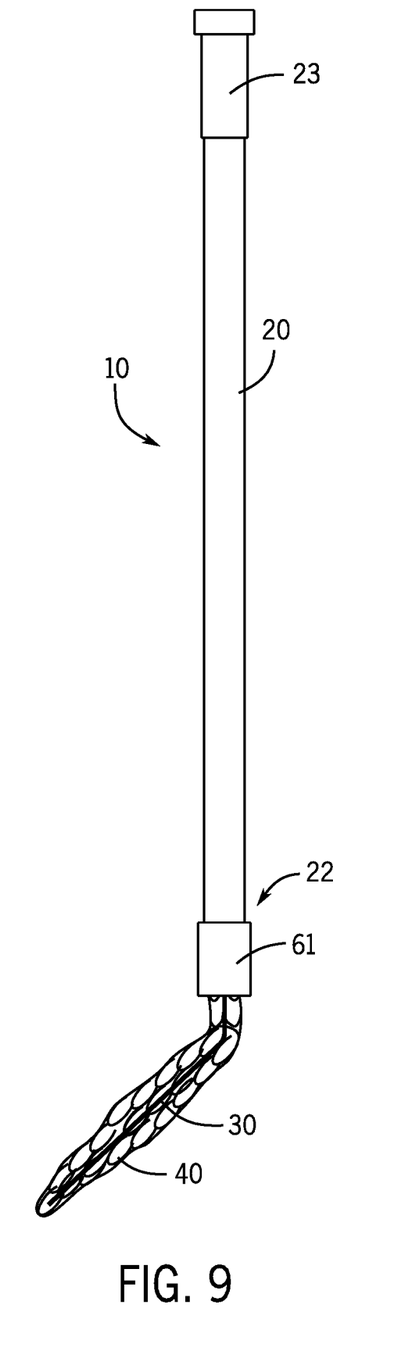
FIG. 9 is a right side view of another example apparatus according to the present disclosure
Figure 10:
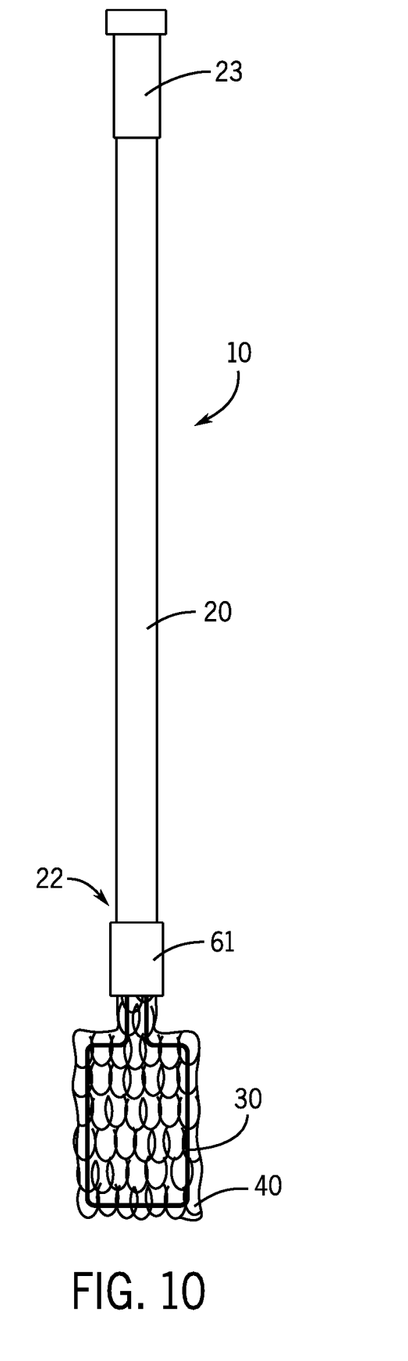
FIG. 10 is a front side view of the apparatus of FIG. 9.

FIGS. 9-10 depict an example apparatus 10 with a collar 61 received onto the second rod end 22 to thereby sandwich the legs 36 (see FIG. 4) and/or the netting 40 wrapped around the legs 36 between the collar 61 and the exterior surface of the rod 20. Thus, the frame 30 is coupled to the second rod end 22. Note that fiction forces and/or compression forces formed by and between the legs 36, the collar 61, and/or the exterior surface of the rod 20 maintain coupling between the components. In certain examples, adhesives help hold the collar 61 on the second rod end 22. Note the collar 61 can be formed from any suitable material, and in one example, the collar 61 is a PVC cylinder. Also note that in certain examples, the collar 61 is a formed from a strip of adhesive tape that is wrapped around the second rod end 22.

Figure 11:
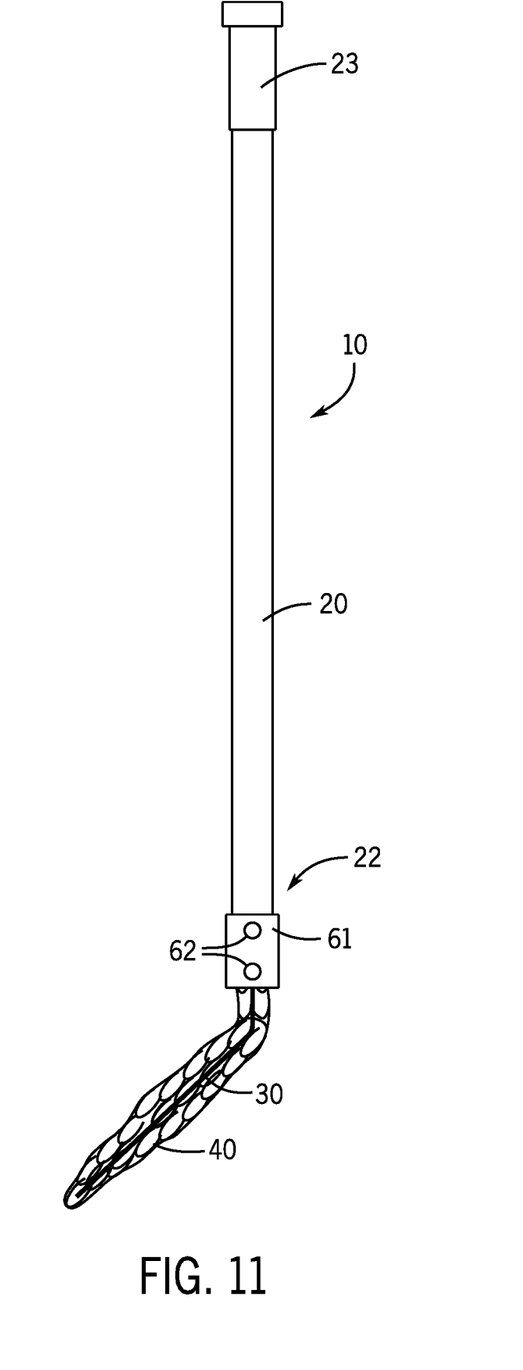
FIG. 11 is a right side view of another example apparatus according to the present disclosure
Figure 12:
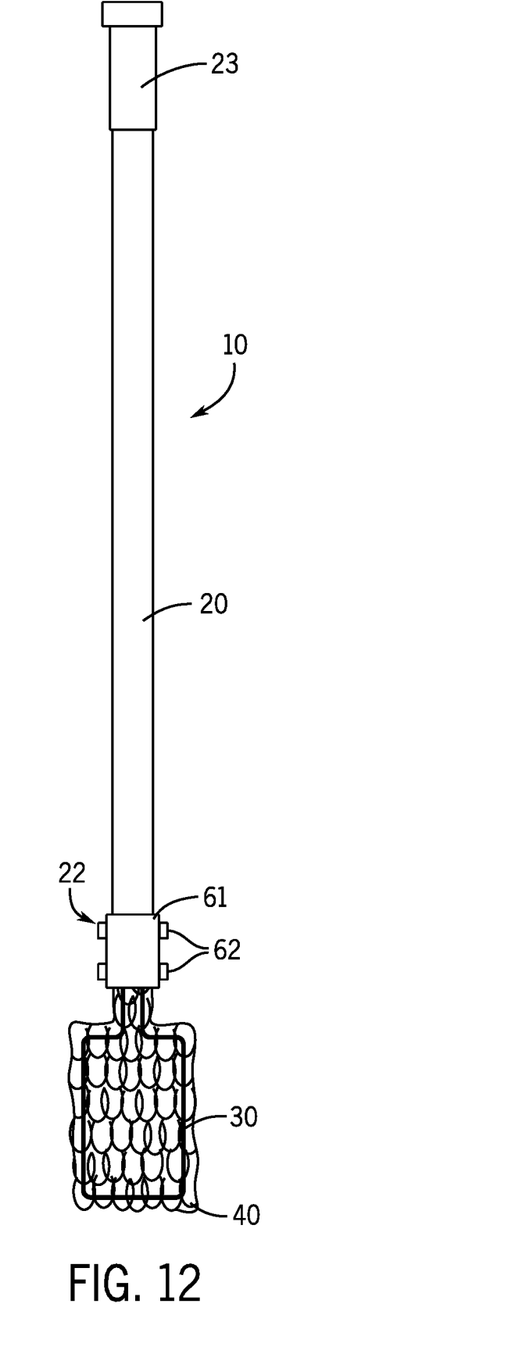
FIG. 12 is a front side view of the apparatus of FIG. 11.

FIGS. 11-12 depict another example apparatus 10 with a collar 61 and mechanical fasteners 62 that couple the frame 30 and the netting 40 to the rod 20. In this example, the legs 36 are between the exterior surface of the rod 20 and the collar 61, and the mechanical fasteners 62 (e.g., bolts with nuts) extend through the holes 43 (see FIG. 4), holes (not shown) in the collar 61, and holes (not shown) in the rod 20. Note that the mechanical fasteners 62 also extend through a portion of the netting. Further note that in another example the collar 61 is excluded and instead the legs 36 are located in the bore 25 of the rod 20 (see FIGS. 3-4). In this example, the mechanical fasteners 62 extend through holes (not shown) in the rod 20 and the holes 43 (FIG. 4) in the legs 36.

Figure 13:
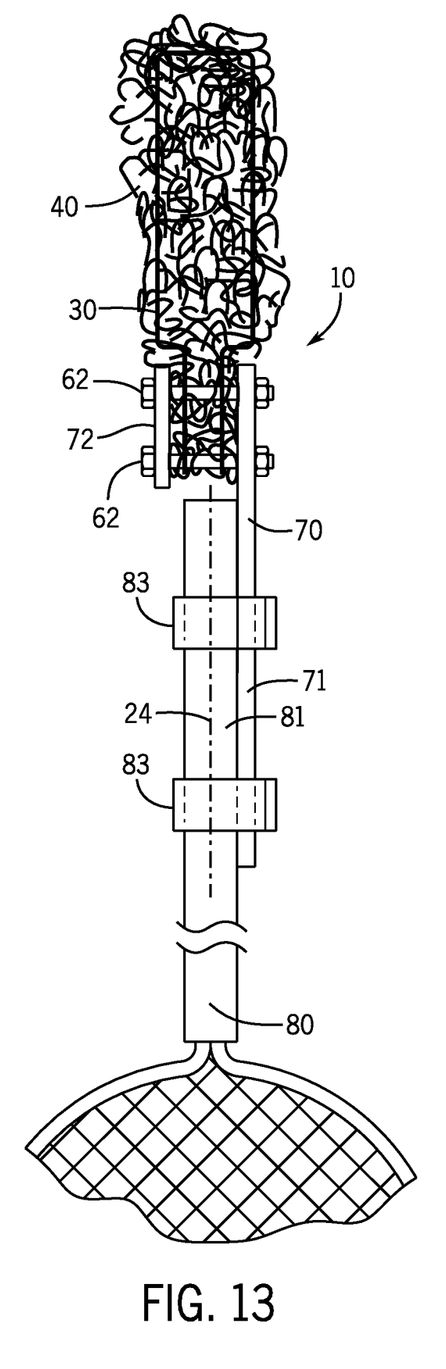
FIG. 13 is a side view of another example apparatus according to the present disclosure.

FIG. 13 depicts another example apparatus 10 of the present disclosure. In this example, the apparatus 10 does not include a rod 20 (see FIG. 1) and instead includes a bracket 70 for mounting the frame 30 and the netting 40 onto an end of another device, such as a handle end 81 of a fishing device (e.g., a fishing net 80). The bracket 70 includes a first member 71 (e.g., rod, plate) that extends along the exterior surface of the handle end 81 and a second member 72 (e.g., rod, plate) coupled to the first member 71 with mechanical fasteners 62 that extend through holes (not depicted) in the members 71, 72. Note that members 71, 72, of the bracket 70 extend parallel to the first axis 24. The mechanical fasteners 62 couple to the frame 30 and the netting 40. The first member 71 is coupled to the handle end 81 with one or more connection devices 83, such as hook-and-loop strips and clamps.

Figure 14:
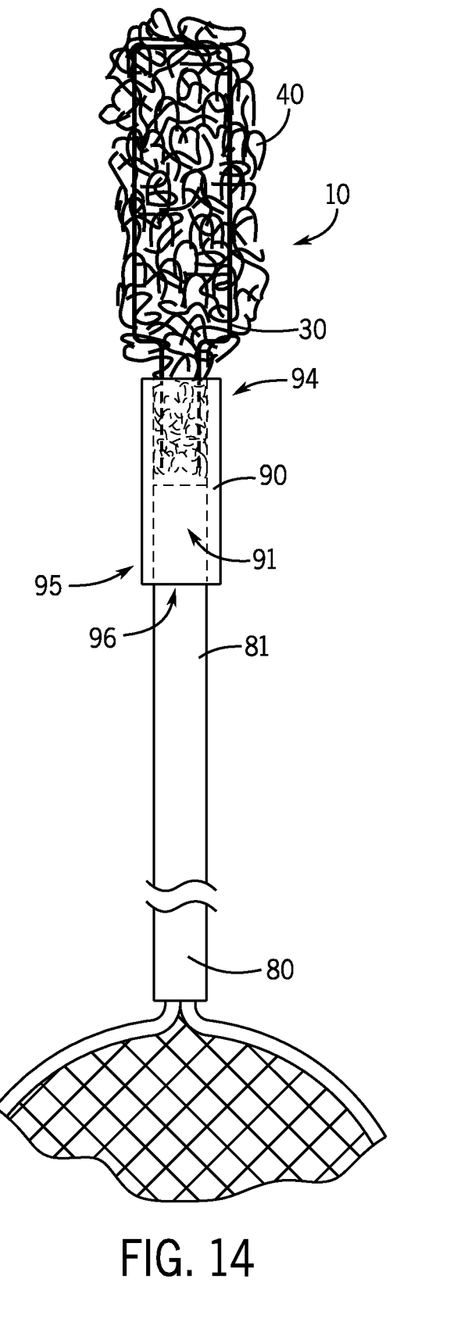
FIG. 14 is a side view of another example apparatus according to the present disclosure.

FIG. 14 depicts another example apparatus of the present disclosure. In this example, the apparatus 10 does not include a rod 20 (see FIG. 1) and instead includes a sleeve 90 having an interior channel 91. The sleeve 90 has a first end 94 from which the frame 30 and the netting 40 extend and an opposite second end 95. The channel 91 extends to the second end 95 to thereby define an opening 96. In operation, the sleeve 90 is received onto the handle end 81 of the fishing net 80. As such, the handle end 81 is in the passes through the opening 96 and into the channel 91. Thus, the apparatus 10 is coupled to the fishing net 80. The sleeve 90 can include a layer of compressible material within the channel 91 that contacts the exterior surface of the handle end 81. Note that the diameter of the channel 91 is equal to or slightly larger than the diameter of the handle end 81.

Figure 15:
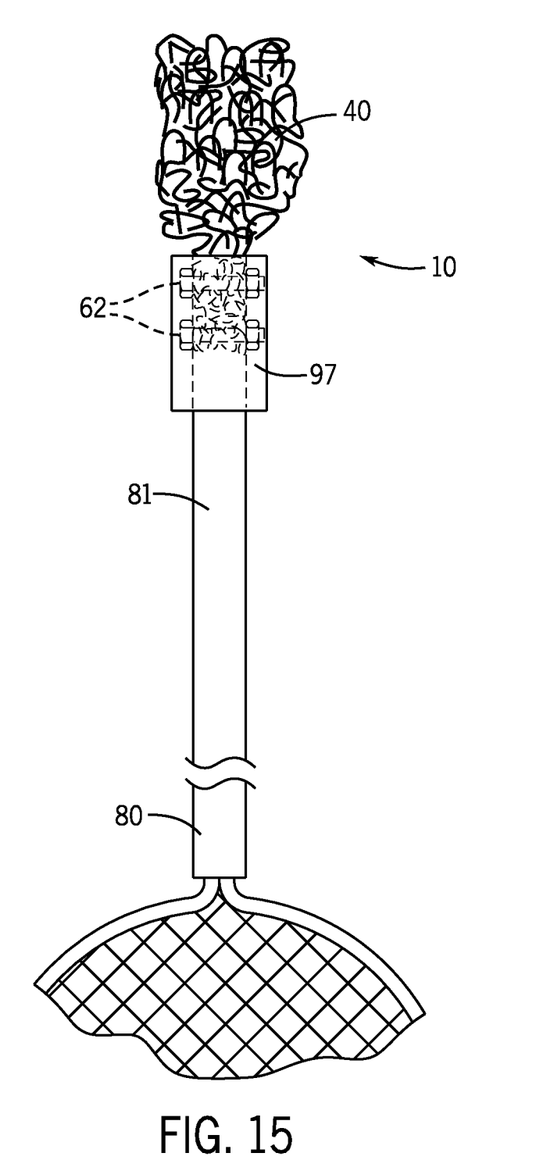
FIG. 15 is a cross sectional view of another example apparatus according to the present disclosure.

FIG. 15 depicts another example apparatus 10 of the present disclosure. In this example, the apparatus 10 is secured to the end of the fishing net 80. Specifically, a first portion of the netting 40 is in the hollow handle end 81 of the fishing net 80 and a second portion of the netting 40 extends away from handle end 81. Two fasteners 62 (e.g., mechanical fasteners such as bolts with nuts) are used to couple the netting 40 in the handle end 81 to the fishing net 80. A protective sleeve or wrapping 97 is then wrapped around the handle end 81 and the fasteners 62. The wrapping 97 can be any suitable material such as foam tape, rubber, cork, or plastic. The apparatus 10 is advantageously capable of being coupled to any existing fishing net 80 or other device with a hollow end. Thus, the apparatus 10 can be retrofitted onto a wide variety of devices and further removed from certain devices and reinstalled onto other devices as the needs of the fisher change. In another example, the wrapping 97 could be a foam handle of the fishing net 80 that is reinstalled onto the handle end 81 after the netting 40 and fasteners 62 are coupled to the handle end 81. Note that in the example depicted in FIG. 15, the apparatus 10 is depicted without the frame 30. However, the frame 30 could be added in other examples.

The present inventor performed many experiments while developing the example apparatuses noted above. During the experiments, the present inventor discovered that in certain situations constraining or limiting the movement of netting (as noted above) helped the fisher to ensnare the exposed hooks in the netting quickly and easily without moving the apparatus and/or the netting several times past the exposed hook. As such, the fisher could quickly release the fish with limited effort and stress. Accordingly, the present inventor developed the frame noted above to help constrain or limit movement of the netting.

To compare to the effectiveness of the apparatuses described above relative to known devices (e.g., the device disclosed in U.S. patent application Ser. No. 09/825,050), the present inventor performed several tests using a model wooden fish with lures having treble hook(s) placed into a mouth-like cavity at one end. The model fish was then placed into the water and attempts were made to remove the hook(s). In one series of experiments using one known device and one example apparatuses of the present disclosure, the twenty-two passes were necessary to remove the embedded hooks ten times while using the known device and eleven passes were necessary to remove the embedded hooks ten times while using the example apparatus of the present disclosure. Success of removing the embedded hook on the first pass was 4 of 10 when using the known device versus 9 of 10 when using the example apparatus of the present disclosure (by Chi Square analysis, the results were statistically significant at P=0.0119). In a second set of experiments, the known device version required forty passes to remove the embedded hooks twenty times, versus twenty-four passes to remove the embedded hooks twenty times while using the example apparatus of the present disclosure. The success on the first pass was 5 of 20 for the known device versus success on the first pass was 16 of 20 for the example apparatus of the present disclosure (by Chi Square analysis, the results were statistically significant at P=0.000496). Therefore, even though the known version could eventually remove the embedded hooks, the example apparatus of the present disclosure was much more efficient and required fewer passes.

The present inventor has also recognized that some known devices would sometimes ensnare the incorrect, unembedded treble hook of a lure having multiple treble hooks. As such the fish could not be released while still in the water and the fish would be lifted into the boat to remove the embedded hook. The rectangular shape and thin profile of the body of the frame in certain examples of the apparatus described above advantageously was better suited to approaching and ensnaring the correct exposed hook of the treble hook that is embedded in the fish. The present inventor conducted a study to compare a known device and an example apparatus of the present disclosure for removing a lure with two treble hooks from the model fish in the water.

The lure used was a 4.0 inch Rapala with two treble hooks—the end treble was planted in the mouth of the "Fish." In ten episodes, the known device was able to remove the treble hooks with sixteen passes. However, in three attempts the wrong treble hook (the one not attached to the model fish) was ensnared. With the example apparatus of the present disclosure, the correct embedded treble hook was removed in each of ten passes with no misses and no snaring of the wrong, un-embedded hooks.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for releasing fish from a hook while the fish is in water, the apparatus comprising:
   a rod having a first rod end and an opposite second rod end;
   a frame extending from the second rod end, the frame having a pair of legs that extend along the rod;
   layers of netting extending along the frame, wherein the layers of netting are configured to ensnare the hook such that the hook can be removed from the fish; and
   a mechanical fastener that couples the second rod end and the frame to each other, wherein the mechanical fastener extends through the netting.

2. An apparatus for releasing fish from a hook while the fish is in water, the apparatus comprising:
   a rod having a first rod end and an opposite second rod end;
   a frame having a pair of legs that extend along the rod and a body extending from the second rod end, wherein the body has a pair of opposing sides and an opening that extends between the opposing sides;
   layers of netting extending along the opening that are configured to ensnare the hook such that the hook can be removed from the fish;
   a collar that encircles the second rod end such that the legs are between the rod and the collar; and
   a mechanical fastener that couples the collar, the second rod end, and the frame to each other, and wherein the mechanical fastener extends through the netting.

* * * * *